United States Patent

Reboul

[11] Patent Number: 5,412,899
[45] Date of Patent: May 9, 1995

[54] ARTIFICIAL BAIT WITH STABILIZERS

[76] Inventor: Hauser G. Reboul, 4316 Lake Villa Dr., Metairie, La. 70002

[21] Appl. No.: 170,535
[22] Filed: Dec. 20, 1993
[51] Int. Cl.⁶ .......................................... A01K 85/02
[52] U.S. Cl. ........................... 43/42.13; 43/42.27; 43/42.11; 43/42.42
[58] Field of Search ................. 43/42.13, 42.14, 42.26, 43/42.28, 42.3, 42.4, 42.42, 42.43, 42.1, 42.11, 42.27

[56] References Cited

U.S. PATENT DOCUMENTS

| D. 87,373 | 7/1932 | Weber | 43/42.28 |
|---|---|---|---|
| D. 175,788 | 10/1955 | Magnus | 43/42.28 |
| 1,583,199 | 5/1926 | Taylor | 43/42.42 |
| 1,773,561 | 8/1930 | Wethall | 43/42.4 |
| 2,235,331 | 3/1941 | Pugh | 43/42.13 |
| 2,258,080 | 10/1941 | Thomas et al. | 43/42.4 |
| 2,476,934 | 7/1949 | Watkins, Sr. | 43/42.26 |
| 2,612,717 | 10/1952 | Kuehnel | 43/42.14 |
| 4,317,305 | 3/1982 | Firmin | 43/42.24 |
| 4,450,645 | 5/1984 | Ancona | 43/42.26 |
| 4,718,191 | 1/1988 | Gentry | 43/42.13 |
| 4,887,378 | 12/1989 | Sheehan et al. | 43/42.25 |
| 5,134,800 | 8/1992 | Sheehan | 43/42.26 |
| 5,226,268 | 7/1993 | Sisson | 43/42.13 |
| 5,231,786 | 8/1993 | Hughes | 43/42.39 |

Primary Examiner—P. Austin Bradley
Assistant Examiner—James Miner

[57] ABSTRACT

An improved artificial bait which includes a wire body portion, a first lower leg of the body portion having a molded head portion and terminating in a fish hook member; a second upper leg of the body portion extending from a juncture with the first leg portion, and terminating in a spinning blade member; and an eyelet positioned at the juncture of the first and second leg portions for attaching a fishing line. A plurality of stiff stabilizing bristles is provided, arranged in two groups, each group extending rearward from the molded head portion, at preferably a 30 degree angle from the centerline of the body portion, sufficient to provide a stabilizing force to maintain the spinner bait upright as the spinner bait is pulled through the water. The bristles extend downward below the plane of the hook shaft to prevent the bait from snagging as it is pulled over obstacles beneath the water.

11 Claims, 2 Drawing Sheets 5,412,899

ARTIFICIAL BAIT WITH STABILIZERS

BACKGROUND OF THE INVENTION

1. Field Of The Invention

The present invention relates to artificial baits, more particularly spinner baits. More particularly, the present invention relates to artificial spinner baits which incorporate stabilizers to provide stability to the bait as it moves through the water and over obstacles in the water.

2. General Background

There are present in the art an abundance of artificial baits and lures which provide an alternative to live bait. The objective in utilizing artificial baits is to present a bait which resembles, as closely as possible, a live bait, as it is pulled through the water, set on the bottom, or floating on the top of the water, such as fly baits. In order to meet this objective, particularly when the artificial bait is being pulled through the water, one must assure that the bait, as it is designed to resemble the live bait, remains upright and stable. If the bait does not travel through the water upright, a fish will not be attracted by the bait, and it is practically useless.

In the area of artificial spinner baits, these types of artificial baits usually provide for a spinning blade secured to one end of a spinner body, and a hook and bait head attached at the other end. Theoretically, the spinner blade both stabilizes the bait as it is moved through the water, and also attracts the fish with the spinning action. However, often times, as the spinner bait is pulled through the water at a faster speed than is allowed, or through heavy current, the torque of the spinner blade would cause the bait to turn on its side which would result in the blade being ineffective in attracting fish, since it would no longer resemble a live bait.

A second problem often confronted with the use of spinner baits relates to structures the bait may encounter beneath the water. Usually, as long as the bait is upright, as it is pulled through the water, the bait will slide over structures, such as logs or the like, since the point of the hook is positioned upright. However, should the spinner bait be pulled with greater speed or through a strong current, as stated earlier, it will tend to lose its upright orientation. When this occurs, the point of the hook is usually positioned sideways or turned completely upside down, and the point of the hook would engage the stump or log beneath the water and a snag would result.

Therefore, it would be very useful to have a device which would solve these and other problems encountered with spinner baits, and the present invention does that. A prior art search has been undertaken, and the patents found in the search are provided herewith, together with the prior art statement being filed herewith.

SUMMARY OF THE PRESENT INVENTION

The apparatus of the present invention solves the problems encountered in the art in a simple and straightforward manner. What is provided is an improved artificial bait which would include a wire body portion, a first lower leg of the body portion having a molded head portion and terminating in a fish hook member; a second upper leg of the body portion extending from a juncture with the first leg portion, and terminating in a spinning blade member; an eyelet positioned at the juncture of the first and second leg portions for attaching a fishing line; and plurality of stiff stabilizing bristles, arranged in two groups (one on each side), each group extending rearward from the molded head portion, at preferably a 30 degree angle from the centerline of the body portion, sufficient to provide a stabilizing force to maintain the spinner bait upright as the spinner bait is pulled through the water, and the bristles extending downward below the plane of the hook shaft to prevent the bait from snagging as it is pulled over obstacles beneath the water or on the surface of the water.

Therefore, it is a principal object of the present invention to provide an improved spinner bait which can be pulled through turbulent water, or at a high speed, and remain in a stable upright position, resembling a live bait;

It is a further object of the present invention to provide a stabilizing system for an artificial bait which allows the bait to remain upright and stable as it is pulled through the water or over obstacles;

It is a further object of the present invention to provide an improved spinner bait which utilizes a plurality of stabilizing bristles extending from the molded head of the bait which prevent the bait from destabilizing should the bait be pulled with excessive speed, through turbulent water, or over obstacles, such as logs beneath the surface or above the surface, of the water.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
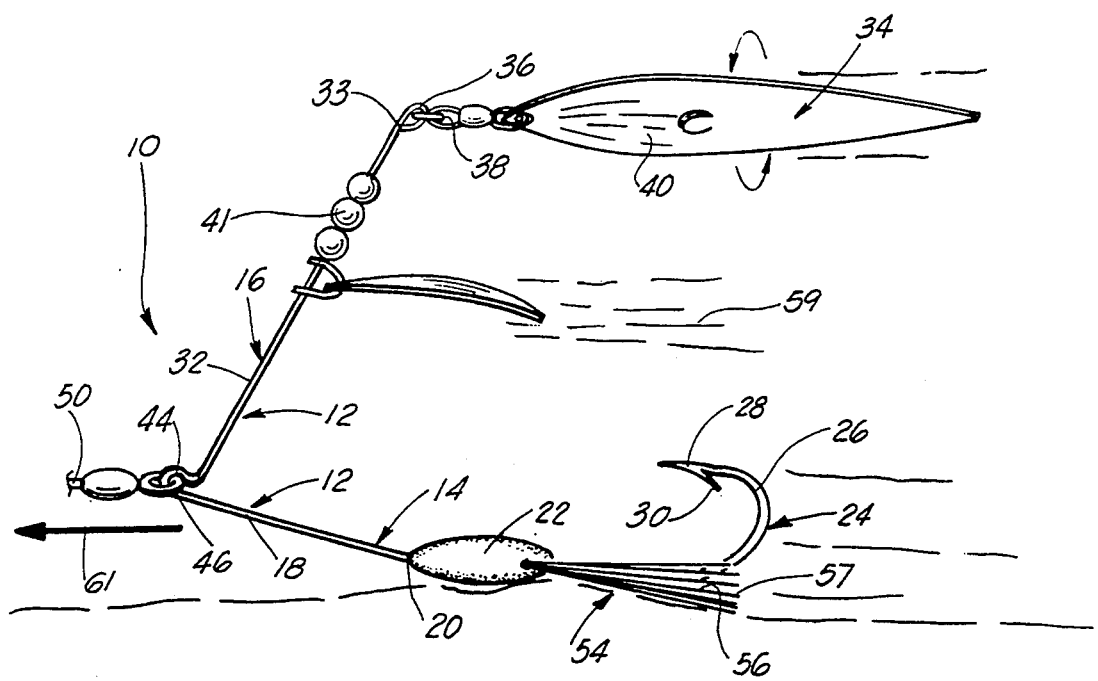
FIG. 1 illustrates an overall perspective view of the preferred embodiment of the present invention.
Figure 2:
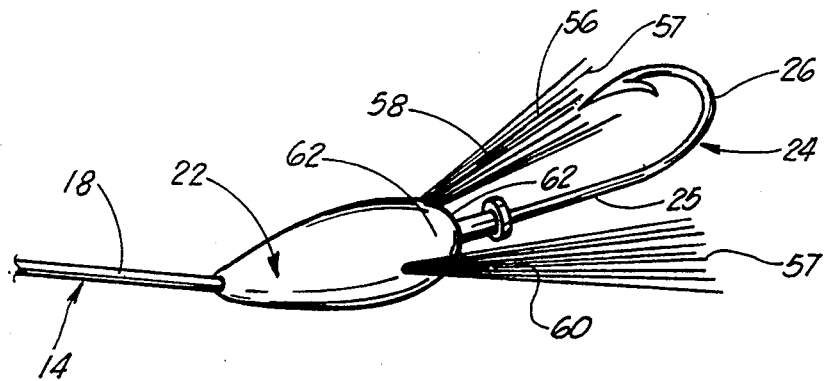
FIG. 2 illustrates a partial view of the stabilizing system of the preferred embodiment of the present invention.

FIGS. 1 through 5 illustrate the preferred embodiment of the present invention by the numeral 10. As illustrated in overall view in FIG. 1, improved bait 10 comprises a wire body member 12, comprising a first lower leg 14 positioned substantially horizontally along the water line 15, and a second upper leg 16 extending upward from lower leg 14 at an angle between 45 and 90 degrees from the alignment of lower leg 14. As illustrated, lower leg 14 further comprises an elongated leg portion 18, terminating at a distal end 20, into a molded head portion 22, formed preferably of lead or some other heavy metal, which provides the greatest weight to the artificial bait 10. Molded head portion 22 has a hook means 24 extending from its rear end, with hook means 24 being a standard hook with a hook shaft 25, an arcuate body 26, and a principal point 28, which includes a barb 30 for snaring a fish which bites at hook 24.

Before discussing the stabilizing means of the present invention, reference is made to the second upper leg 16, which includes an elongate leg portion 32, which terminates at its distal end 33 into a means for attaching a spinner means 34 thereto. As seen in FIG. 1, this means is a eyelet 36 which accommodates a ring 38 attached to a spinning blade 40, which is a conventional spinning blade found in the art, and is used as a means to attract fish while the bait 10 is pulled through the water. Also, as seen in FIG. 1, there may be included a plurality of spheres 41 movably secured along leg 16 which serve as rattlers or colorful spheres to attract fish. Again, these structures are often found on conventional fishing baits.

The means to pull the bait through the water is found at the juncture 44 of lower leg 14 and upper leg 16. At juncture 44 there is formed an eyelet means 46, to which a ring 48 is attached which would provide the means onto which the fishing line 50 would be tied. This structure is not novel, and is found is most artificial baits.

Turning now to the stabilizing means of the present invention, reference is made to the FIGURES overall. As illustrated stabilizing means can be referred to as numeral 54. Means 54 includes a plurality of substantially stiff bristle members 56, arranged in several groups 58, 60, with each group of bristle members 56 protruding from the rear end 62 of the molded head member 22 rearward in the direction of hook member 24. As illustrated in side view in FIG. 1 and top view in FIG. 3, each group 58, 60 of bristle members 56 extend at substantially a 30 degree angle from the center line 21 (See FIG. 3) of body member 22 outward, and substantially on a plane level or slightly below the plane of the shaft 25 of hook member 24. The bristles 56 would extend outward some 1 to 1-½ inches in length, and their most distal end 57 would preferably be below the shaft 25 of hook 24 by at least a quarter of an inch.

Figure 3:
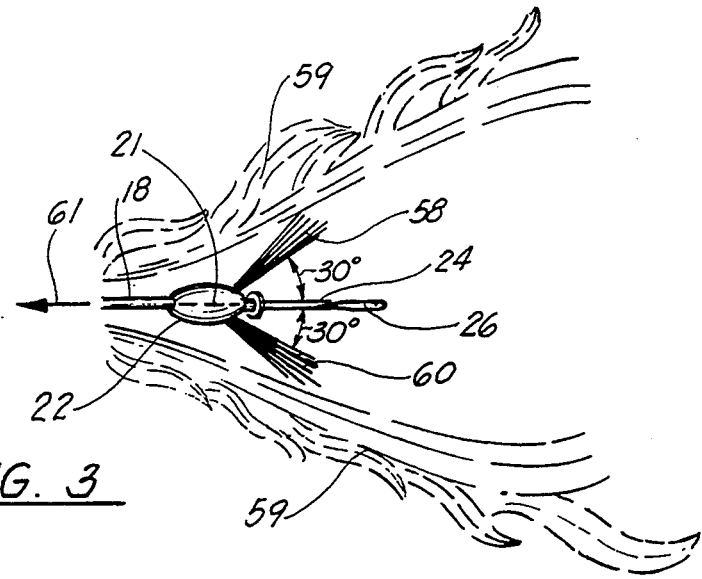
FIG. 3 illustrates an top view of the preferred embodiment of the present invention on a spinner bait travelling through water.

In this position, the two groups 58, 60 of bristle members 56 serve as a stabilizing means in maintaining the bait 10 upright. For example, as seen in FIGS. 1 and 3, as the bait is pulled through the water 59, in the direction of arrow 61, the spinner 34 is rotating due to the force of the water. A conventional bait, without stabilizing means 54 may want to rotate to its side. However, the stabilizing means 54, would assist in stabilizing the bait 10, since they project outward from the head 22 of the bait 10 where the greater weight of the bait 10 is concentrated. Further, due to the positioning of the bristle members 56, so that their distal ends 57 are lower than the shaft 25 of hook 24, should the bait pass over an obstacle, such as a log 64, as seen in FIG. 4, the bristles 56 would tend to support the bait 10 over log 64, and while maintaining it upright, would prevent the hook 24 from snagging the log 64.

Figure 4:
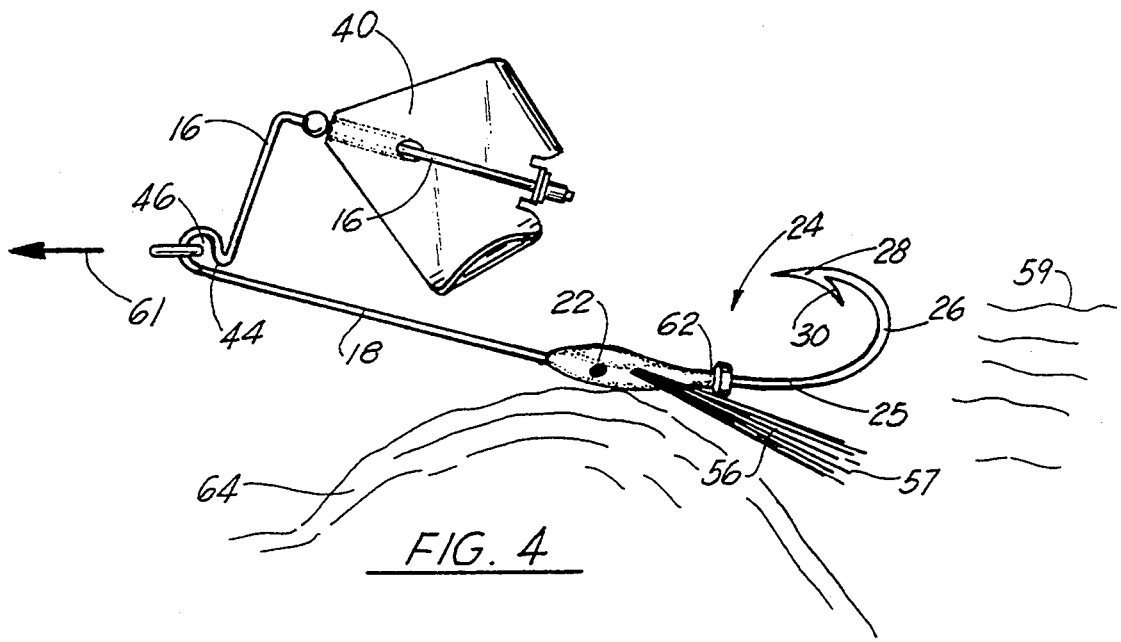
FIG. 4 illustrates an overall perspective view of the preferred embodiment of the present invention on a different version of a spinner bait.
Figure 5:
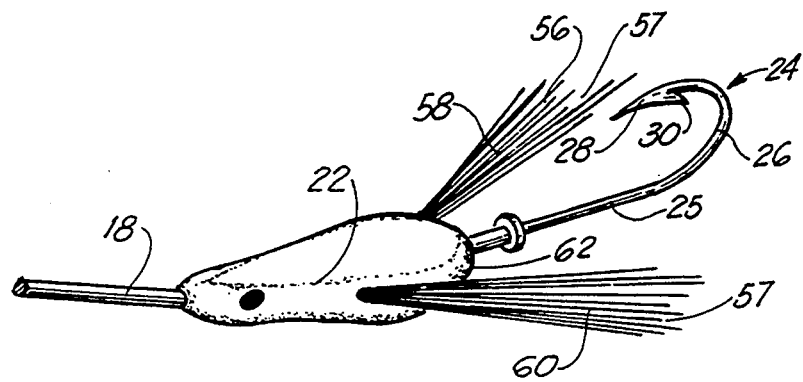
FIG. 5 illustrates a partial view of the stabilizing system of the preferred embodiment of the present invention on the spinner bait illustrated in FIG. 4.

As referenced earlier, FIGS. 4 and 5 illustrate the present invention positioned on a slightly modified type of spinner bait found in the industry. The bait 10 includes all of the structural features as discussed in regard to the embodiment as discussed in reference to FIG. 1, and is numbered identically to that embodiment. The only real structural difference is the fact that the spinner 40 is found along the upper leg 16 and rotates around an axis on that leg, rather than being attached via eyelet 36 as found in FIG. 1. Other than that, and the slightly oversized body member 22 of the embodiment found in FIGS. 4 and 5, the invention functions in the same manner to achieve the same results.

The following table lists the part numbers and part descriptions as used herein and in the drawings attached hereto.

| PARTS LIST | |
| --- | --- |
| artificial bait | 10 |
| body member | 12 |
| first lower leg | 14 |
| second upper leg | 16 |
| leg portion | 18 |
| distal end | 20 |
| center line | 21 |
| head portion | 22 |
| hook means | 24 |
| arcuate body | 25 |
| shaft | 26 |
| principal point | 28 |
| barb | 30 |
| leg portion | 32 |
| distal end | 33 |
| spinner means | 34 |
| eyelet | 36 |
| ring | 38 |
| spinner blade | 40 |
| spheres | 41 |
| juncture | 44 |
| eyelet means | 46 |
| fishing line | 50 |
| stabilizing means | 54 |
| bristle members | 56 |
| distal ends | 57 |
| bristle groups | 58, 60 |
| water | 59 |
| arrow | 61 |
| rear end | 62 |
| log | 64 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An improved artificial bait, comprising:
  a) a bait body having at least an upper leg and a lower leg;
  b) a head portion on the lower leg of the bait body, and providing a hook means extending rearwardly therefrom; and
  c) stabilizing means positioned on the head of the bait body of substantial rigidity for allowing the hook means to remain upright while the bait is being pulled through the water or being pulled over obstacles present in the water, the stabilizing means extending rearwardly of the bait body, from two points off the centerline of the bait body, and at an angle to the plane of the hook shaft and below the plane of the hook shaft.

2. The artificial bait in claim 1, further comprising a spinning member on the upper leg of the bait body for rotating as the bait is pulled through the water.

3. The artificial bait in claim 1, further comprising means to attach the bait body to a fishing line at the juncture of the upper and lower legs.

4. The artificial bait in claim 1 wherein the stabilizing means comprising a first and second group of stiff bristles, each first and second group extending from the bait body head portion at approximately a 30 degree angle from the centerline of the body.

5. The artificial bait in claim 4 wherein the bristles extend some 1 to 1-½ inches rearward of the bait head portion.

6. An improved artificial spinning bait, comprising:
   a) a bait body having at least an upper leg and a lower leg;
   b) a head portion on the lower leg of the bait body, and providing a hook means having a hook shaft and extending rearwardly from the head portion;
   c) a spinning member on the upper leg of said bait body to spin while the bait is pulled through the water; and
   d) stabilizing means positioned on the head of the bait body, the stabilizing means further comprising a first and second group of bristles of sufficient stiffness to allow the hook member to remain upright while the bait is being pulled through the water or while the bait is being pulled over obstacles present in the water, each first and second group extending from the bait body head portion at approximately a 30 degree angle from the centerline of the body, to a distance of 1 to 1-½ inches, and at an angle to the plane of the hook shaft, and below the plane of the hook shaft, in part so that the distal bristles make contact with underwater obstacles rather than the hook to prevent snags.

7. An improved artificial bait, comprising:
   a) a bait body having at least an upper leg and a lower leg;
   b) a head portion on the lower leg of the bait body, and providing a hook means having a hook shaft and extending rearwardly from the head portion; and
   c) stabilizing means positioned on the head of the bait body, the stabilizing means further comprising a first and second group of bristles of sufficient stiffness to allow the hook member to remain upright while the bait is being pulled through the water or while the bait is being pulled over obstacles present in the water, each first and second group extending from the bait body head portion at approximately a 30 degree angle from the centerline of the body, and at an angle to the plane of the hook shaft and below the plane of the hook shaft.

8. The artificial bait in claim 7, further comprising a spinning member on the upper leg of the bait body for rotating as the bait is pulled through the water.

9. The artificial bait in claim 7, further comprising means to attach the bait body to a fishing line at the juncture of the upper and lower legs.

10. The artificial bait in claim 7 wherein the two groups of stabilizing bristles allow the hook member to remain upright while the bait is being pulled through the water or over obstacles present in the water.

11. The artificial bait in claim 7 wherein the bristles extend some 1 to 1-½ inches rearward of the bait head portion.

* * * * *